United States Patent
Tsai et al.

(10) Patent No.: US 9,813,738 B2
(45) Date of Patent: Nov. 7, 2017

(54) METHOD AND APPARATUS OF ADAPTIVE LOOP FILTERING

(75) Inventors: Chia-Yang Tsai, New Taipei (TW); Chih-Ming Fu, Hsinchu (TW); Ching-Yeh Chen, Taipei (TW); Yu-Wen Huang, Taipei (TW); Shaw-Min Lei, Hsinchu (TW)

(73) Assignee: HFI Innovation Inc., Zhubei (TW)

(*) Notice: Subject to any disclaimer, the term of this patent is extended or adjusted under 35 U.S.C. 154(b) by 555 days.

(21) Appl. No.: 13/216,242

(22) Filed: Aug. 24, 2011

(65) Prior Publication Data

US 2012/0082241 A1    Apr. 5, 2012

Related U.S. Application Data

(60) Provisional application No. 61/390,068, filed on Oct. 5, 2010.

(51) Int. Cl.
*H04N 19/82* (2014.01)
*H04N 19/42* (2014.01)
(Continued)

(52) U.S. Cl.
CPC ........... *H04N 19/82* (2014.11); *H04N 19/117* (2014.11); *H04N 19/119* (2014.11);
(Continued)

(58) Field of Classification Search
CPC ....... H04N 19/00533; H04N 19/00545; H04N 19/00781; H04N 19/00884; H04N 7/26;
(Continued)

(56) References Cited

U.S. PATENT DOCUMENTS

| 8,259,819 B2 | 9/2012 | Liu et al. |
| 2010/0074323 A1 | 3/2010 | Fu et al. |

(Continued)

FOREIGN PATENT DOCUMENTS

| CN | WO 2010/034204 A1 | 4/2010 |
| CN | 101841706 | 9/2010 |

(Continued)

OTHER PUBLICATIONS

McCann et al., "Samsung's Response to the Call for Proposals on Video Compression Technology", in Document: JCTVC-A124, Joint Collaborative Team on Video Coding (JCT-VC) of ITU-T SG16 WP3 and ISO/IEC JTC1/SC29/WG11, 1st Meeting: Dresden, DE, Apr. 15-23, 2010.*

(Continued)

*Primary Examiner* — David N Werner
(74) *Attorney, Agent, or Firm* — Oblon, McClelland, Maier & Neustadt, L.L.P.

(57) ABSTRACT

A method and apparatus for processing in-loop reconstructed video using an in-loop filter is disclosed. In the recent HEVC development, adaptive loop filtering (ALF) is being adopted to process in-loop reconstruction video data, where ALF can be selectively turned ON or OFF for each block in a frame or a slice. An advanced ALF is disclosed later that allows a choice of multiple filter sets that can be applied to the reconstructed video data adaptively. In the present disclosure, pixels of the in-loop reconstructed video data are divided into a plurality of to-be-filtered regions, and an in-loop filter from a filter set is determined for each to-be-filtered region based on a rate-distortion optimization procedure. According to one embodiment of the present invention, computation of cost function associated with the rate-distortion optimization procedure is related to correlation values associated with original video data and the (Continued)

in-loop reconstructed video data. Furthermore, the correlation values can be shared by the multiple candidate filters during the rate-distortion optimization procedure for said each to-be-filtered region. In another embodiment, the correlation values can be shared by multiple candidate to-be-filtered regions of an area of the in-loop reconstructed video data during the rate-distortion optimization procedure for the area of the in-loop reconstructed video data.

17 Claims, 8 Drawing Sheets

(51) Int. Cl.
  *H04N 19/80* (2014.01)
  *H04N 19/147* (2014.01)
  *H04N 19/176* (2014.01)
  *H04N 19/17* (2014.01)
  *H04N 19/182* (2014.01)
  *H04N 19/119* (2014.01)
  *H04N 19/117* (2014.01)

(52) U.S. Cl.
  CPC ........... *H04N 19/147* (2014.11); *H04N 19/17* (2014.11); *H04N 19/176* (2014.11); *H04N 19/182* (2014.11); *H04N 19/439* (2014.11); *H04N 19/80* (2014.11)

(58) Field of Classification Search
  CPC ....... H04N 19/00278; H04N 19/00933; H04N 21/2383; H04N 21/4382; H04N 19/117; H04N 19/439; H04N 19/80; H04N 19/82
  USPC ............ 375/240.25, 240.27, 240.29, 240.24, 375/240.18
  See application file for complete search history.

(56) References Cited

U.S. PATENT DOCUMENTS

| | | | |
|---|---|---|---|
| 2010/0329361 A1* | 12/2010 | Choi et al. | 375/240.29 |
| 2011/0142136 A1* | 6/2011 | Liu et al. | 375/240.18 |
| 2011/0170608 A1* | 7/2011 | Shi et al. | 375/240.24 |
| 2011/0216828 A1* | 9/2011 | Yang | H04N 7/0132 375/240.12 |
| 2012/0287988 A1* | 11/2012 | Chong et al. | 375/240.02 |

FOREIGN PATENT DOCUMENTS

| | | |
|---|---|---|
| WO | 2009074117 A1 | 6/2009 |
| WO | 2009133844 A1 | 11/2009 |
| WO | 2009151563 A1 | 12/2009 |
| WO | WO 2010/030744 | 3/2010 |
| WO | 2010034205 A1 | 4/2010 |
| WO | WO 2010034204 A1 * | 4/2010 |
| WO | 2010083438 A2 | 7/2010 |

OTHER PUBLICATIONS

McCann et al., entitled "Samsung's Response to the Call for Proposals on Video Compression Technology", in Document: JCTVC-A124, Joint Collaborative Team on Video Coding (JCT-VC) of ITU-T SG16 WP3 and ISO/IEC JTC1/SC29/WG11, 1st Meeting: Dresden, DE, Apr. 15-23, 2010.

Flierl, M. et al.,"A Locally Optimal Design Algorithm for Block-Based Multi-Hypothesis Motion-Compensated Prediction", Proceedings of the Data Compression Conference, Snowbird, USA, Apr. 1998.

Patent examination report No. 1, Australian Government, IP Australia, dated Oct. 31, 2013.

Yu-Wen Huang, et al, In-Loop Adaptive Restoration, JointCollaborative Team on Video Coding (JCT-VC) of ITU-T SG16WP3 and ISO/IecEC JTC1/SC29/WG11, JCTVC-B077, 2ndMeeting, Jul. 21-28, 2010, pp. 1-11, Geneva, CH.

Takeshi Chujoh, et al, Specification and experimental resultsof Quadtree-based Adaptive Loop Filter, ITU-Telecommunications-Standardization Sector Study Group 16 Question 6 VideoCoding Experts Group (VCEG), VCEG-AK22_r1, 37th Meeting,Apr. 15-18, 2009, pp. 1-11, Yokohama, Japan.

Marta Karczewicz, et al, Video coding technology proposalby Qualcomm Inc. Joint Collaborative Team on Video Coding(JCT-VC) of ITU-T SG16 WP3 and ISO/IEC JTC1/SC29/WG11,JCTVC-A121, 1st Meeting, Apr. 15-23, 2010, pp. 1-12, Dresden,DE.an.

Marta Karczewicz, et al, Video coding technology proposalby Qualcomm Inc. Joint Collaborative Team on Video Coding(JCT-VC) of ITU-T SG16 WP3 and ISO/IEC JTC1/SC29/WG11,JCTVC-A121, 1st Meeting, Apr. 15-23, 2010, pp. 1-12, Dresden,DE.

Chih-Ming Fu, et al, CE8 Subset3: Picture Quadtree Adaptive Offset, Joint Collaborative Team on Video Coding (JCT-VC) of ITU-T SG16 WP3 and ISO/IEC JTC1/SC29/WG11, 4th Meeting:Daegu, KR, Jan. 2011, JCTVC-D122_r3, pp. 1-10.

Tsai, C.Y., et al.; "Coding Unit Synchronous Picture Quadtree-based Adaptive Loop Filter;" Joint Collaborative Team on Video Coding (JCT-VC) of ITU-T SG16 WP3 and ISO/IEC JTC1/SC29/WG11; Oct. 2010; pp. 1-12.

Guo, X., et al.; "Localized Multiple Adaptive Interpolation Filters with Single-Pass Encoding;" Visual Communications and Image Processing; 2010; pp. 1-8.

Suzuki, T, et al.; "Description of video coding technology proposal by Sony;" Joint Collaborative Team on Video Coding (JCT-VC) of ITU-T SG16 WP3 and ISO/IEC JTC1/SC29/WG11; Apr. 2010; pp. 1-51.

* cited by examiner

METHOD AND APPARATUS OF ADAPTIVE LOOP FILTERING

CROSS REFERENCE TO RELATED APPLICATIONS

The present invention claims priority to U.S. Provisional Patent Application Ser. No. 61/390,068, 2010, entitled "Improved In-Loop Filter", filed Oct. 5, 2010. The present invention is also related to U.S. patent application Ser. No. 13/093,068, entitled "Method and Apparatus of Adaptive Loop Filtering", filed Apr. 25, 2011, U.S. patent application Ser. No. 12/987,151, entitled "Apparatus and Method of Adaptive Offset for Video Coding", filed Jan. 9, 2011, and U.S. patent application Ser. No. 12/405,251, entitled "Adaptive Filter", filed Mar. 17, 2009. The U.S. Provisional Patent Application and the U.S. patent applications are hereby incorporated by reference in their entireties.

FIELD OF THE INVENTION

The present invention relates to video coding. In particular, the present invention relates to coding techniques associated with in-loop filtering.

BACKGROUND

Motion compensated inter-frame coding has been widely adopted in various coding standards, such as MPEG-1/2/4 and H.261/H.263/H.264/AVC. Motion estimation and compensation as well as subsequent processing in such coding systems are performed on a block basis. During compression process, coding noises may arise due to lossy operations applied such as quantization. The coding artifacts may become noticeable in the reconstructed video data, especially at or near block boundaries. In order to alleviate the visibility of coding artifacts, a technique called deblocking has been used in newer coding systems such as H.264/AVC and the High Efficiency Video Coding (HEVC) system being developed. The deblocking process applies filtering across block boundaries adaptively to smooth the large transitions at and near block boundaries due to coding noises while retaining image sharpness. Furthermore, due to the nature of inter-frame coding, the deblocking process is configured for in-loop operation. In the recent HEVC development, adaptive loop filtering (ALF) is being adopted to process reconstructed frames or deblocked reconstruction frames. Adaptive loop filtering is used as in-loop processing in addition to deblocking and is often applied after deblocking of reconstructed video data. The filter coefficients may be designed according to a known optimization algorithm such as Wiener-Hopf equation that minimizes mean square errors between original frames and reconstruction frames.

In the HEVC system, the conventional ALF can be selectively turned ON or OFF for each block in a frame or a slice. The block size and block shape can be adaptive, and the information of block size and block shape can be explicitly sent to decoders or implicitly derived in a decoder. According to a selected performance criterion, determination will be made for each block regarding whether the block is subject to ALF or not. In U.S. patent application Ser. No. 13/093,068, entitled "Method and Apparatus of Adaptive Loop Filtering", filed Apr. 25, 2011, an advanced ALF is disclosed to allow a choice of multiple filter sets that can be applied to the reconstructed video data adaptively. Furthermore, the advanced ALF adopts a new unit for the filtering process to apply so that more flexible and/or localized processing can be provided. While the U.S. patent application Ser. No. 13/093,068 discloses flexible adaptive loop filters, it is desirable to develop a system incorporating advanced in-loop filter that extends FU (filter unit) to general processing structure (named to-be-filtered region in this disclosure) for in-loop filter and extend ALF to including other in-loop filters. Furthermore, it is desirable to incorporate rate-distortion optimization procedure to optimize system performance among various processing structures and various candidate filters.

BRIEF SUMMARY OF THE INVENTION

A method and apparatus for processing of coded video using adaptive loop filter are disclosed. In one embodiment according to the present invention, the method and apparatus for processing of coded video using adaptive loop filter comprise deriving in-loop reconstructed video data based on associated data; dividing pixels of the in-loop reconstructed video data into a plurality of to-be-filtered regions; determining an in-loop filter from a filter set consisting of multiple candidate filters for each to-be-filtered region, wherein said determining the in-loop filter is based on a rate-distortion optimization procedure; and applying the in-loop filter to said each to-be-filtered region to generate a filtered region. The in-loop filter can be applied to the reconstructed video, SAO (sample adaptive offset) restored video, deblocked video or ALF restored video. One aspect of the present invention is related to method of dividing the pixels of the in-loop reconstructed video data into to-be-filtered regions. The method can be based on a classification method, an image partition method, or a combination of the classification method and the image partition method.

Another aspect of the present invention is related to computation of cost function associated with the rate-distortion optimization procedure. In one embodiment according to the present invention, computation of cost function utilizes correlation values associated with original video data and the in-loop reconstructed video. In another embodiment according to the present invention, computation of cost function utilizes correlation values associated with original video data, prediction signal and recovered prediction error. In one embodiment according to the present invention, the correlation values can be shared by the multiple candidate filters during the rate-distortion optimization procedure for said each to-be-filtered region. In another embodiment according to the present invention, the correlation values are shared by multiple candidate to-be-filtered regions of an area of the in-loop reconstructed video data during the rate-distortion optimization procedure for the area of the in-loop reconstructed video data. The in-loop filter can be a linear spatial filter having filter coefficients, an edge offset filter, or a band offset filter. When the linear spatial filter is used, computation of cost function associated with the rate-distortion optimization procedure is related to the filter coefficients and correlation values associated with original video data in-loop reconstructed video data. Alternatively, computation of cost function associated with the rate-distortion optimization procedure is related to the filter coefficients and correlation values associated with original video data, prediction signal and recovered prediction error. Information of the in-loop filter can be incorporated in video bitstream so that a decoder can select the same in-loop filter as the encoder.

A method and apparatus for processing of coded video using adaptive loop filter in a video decoder are disclosed. In one embodiment according to the present invention, the method and apparatus for processing of coded video in a video decoder using adaptive loop filter comprise deriving in-loop reconstructed video data based on associated data; dividing pixels of the in-loop reconstructed video data into a plurality of to-be-filtered regions; determining an in-loop filter from video bitstream for each to-be-filtered region; and applying the in-loop filter to said each to-be-filtered region to generate a filtered region.

DETAILED DESCRIPTION OF THE INVENTION

For digital video compression, motion compensated inter-frame coding is an effective compression technique and has been widely adopted in various coding standards, such as MPEG-1/2/4 and H.261/H.263/H.264/AVC. In a motion compensated system, motion estimation/compensation and subsequent compression is often performed on a block by block basis. During compression process, coding noises may arise due to lossy operations applied such as quantization. The coding artifacts may become noticeable in the reconstructed video data, especially at or near block boundaries. In order to alleviate the visibility of coding artifacts, a technique called deblocking has been used in newer coding systems such as H.264/AVC and the High Efficiency Video Coding (HEVC) system being developed. The deblocking process applies filtering across block boundaries adaptively to smooth the large transitions at and near block boundaries due to coding noises while retaining image sharpness. Furthermore, due to the nature of inter-frame coding, the deblocking process is configured for in-loop operation.

Besides deblocking, various in-loop filters, such as the adaptive loop filter based on a linear spatial filter, the edge offset filter and the band offset filter, have been introduced in HEVC. The in-loop edge offset process and the in-loop band offset process disclosed by McCann et al., entitled "Samsung's Response to the Call for Proposals on Video Compression Technology", in Document: JCTVC-A124, Joint Collaborative Team on Video Coding (JCT-VC) of ITU-T SG16 WP3 and ISO/IEC JTC1/SC29/WG11, 1st Meeting: Dresden, Del., 15-23 Apr. 2010 are considered as an edge offset filter and a band offset filter respectively in this disclosure. Furthermore, a video system incorporating advanced in-loop filter is disclosed in U.S. patent application Ser. No. 13/093,068, filed Apr. 25, 2011, where a filter set consisting of multiple filters is selected to process the reconstructed video, SAO restored video, or deblocked video data that can be divided into filter units. Furthermore, the reconstructed video data can be classified into multiple categories using classification, and an adaptive loop filter is selected from the candidate filter set for each of the categories. While U.S. patent application Ser. No. 13/093,068 discloses flexible adaptive loop filter, it is desirable to develop a system incorporating advanced in-loop filter that extends FU to general processing structure (named to-be-filtered region in this disclosure) for in-loop filter and extend ALF to including other in-loop filters. Furthermore, it is desirable to incorporate rate-distortion optimization procedure to optimize system performance among various processing structures and various candidate filters of the filter set.

Figure 1:
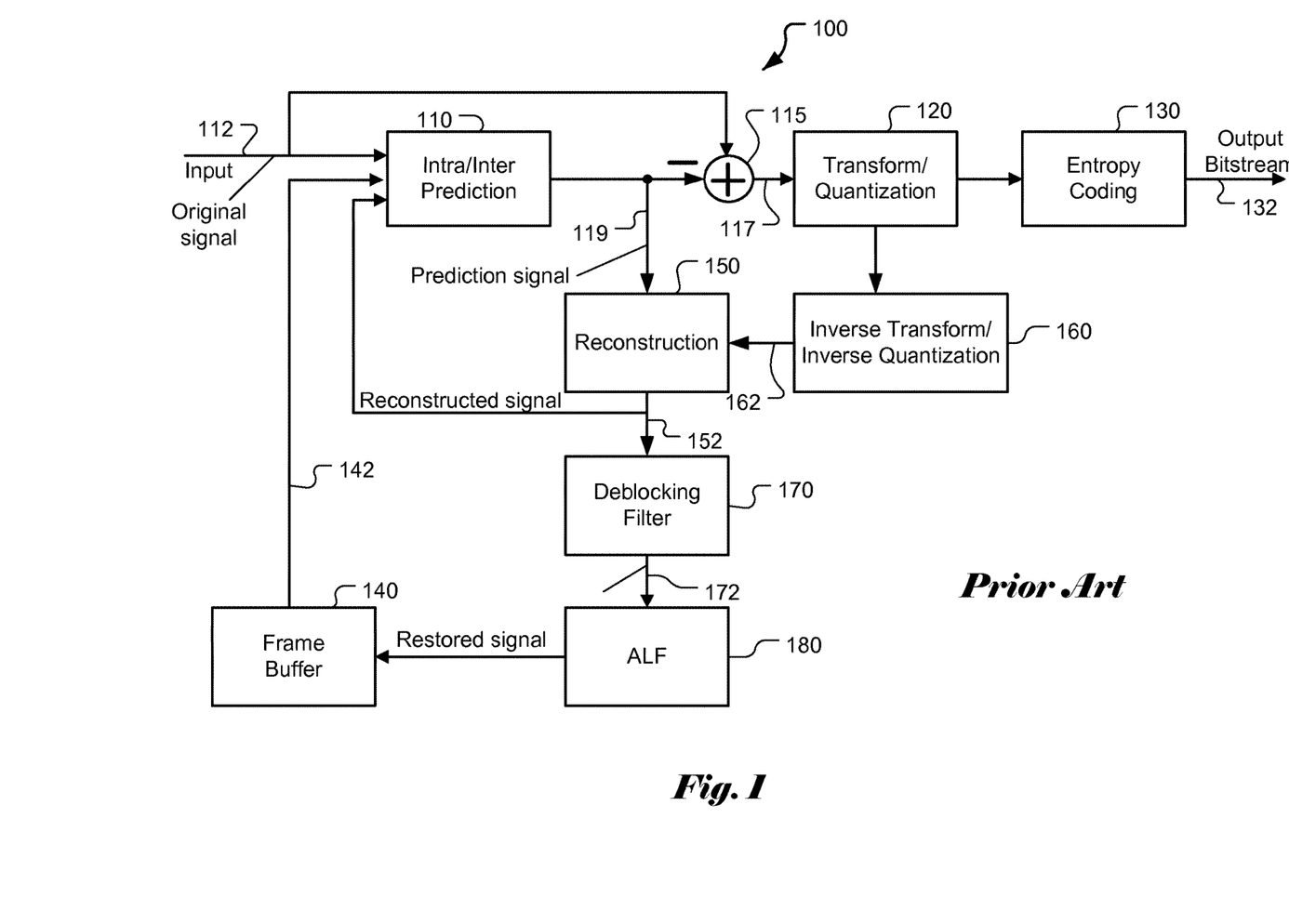
FIG. 1 illustrates an exemplary block diagram of a video coding system incorporating motion compensated prediction, where adaptive loop filter is included to improve video quality.

FIG. 1 illustrates a system block diagram of motion-compensated video compression with deblocking. Compression system 100 illustrates a typical video encoder incorporating intra/inter-prediction, transformation/quantization and entropy coding to generate compressed video bitstream. The input video data enters the encoder through input interface 112 and the original signal is subject to intra/inter-prediction 110, where intra/inter prediction 110 forms prediction signal 119 based on input signal 112, reconstructed signal 152 and previously processed and reconstructed signal 142 stored in frame buffer 140. The inter prediction can be a forward prediction mode, where the prediction is based on a picture prior to the current picture. The inter prediction may also be a backward prediction mode where the inter prediction is based on a picture after the current picture in the display order. In the inter-prediction mode, the intra/inter prediction 110 will cause the prediction signal to be provided to the adder 115 and be subtracted from original signal 112. Output 117 from adder 115 is termed as the prediction error that is further processed by the transform/quantization block 120. Transform/quantization 120 converts prediction error 117 into coded symbols for further processing by entropy coding 130 to produce compressed bitstream 132, which is stored or transmitted. In order to reconstruct the video signal, recovered prediction error 162 is combined with the prediction signal 119 to form reconstructed signal 152. Inverse transform/inverse quantization 160 is applied to prediction error 117 processed by transform/quantization 120 to provide reconstructed prediction error 162. FIG. 1 also illustrates an example of deblocking filter 170 and adaptive loop filter (ALF) 180 that are applied to the reconstructed signal to improve video quality. Any signal after reconstruction that may or may not be further processed is referred to as an in-loop reconstructed video data or in-loop reconstructed frames in this disclosure. For example, the in-loop reconstructed video data may refer to reconstructed signal 152 or de-blocked signal 172. While deblocking filter 170 is shown as an example of processing reconstructed video in FIG. 1, other processing, such as SAO (sample adaptive offset) or a combination of deblocking filter and SAO may be used. The SAO may include sample adaptive edge offset or band offset. In these cases, the in-loop reconstructed video data also refers to any signal before or after the processing mentioned above. Therefore, reconstructed signal 152 or deblocked signal 172 in FIG. 1 is an example of in-loop reconstructed signal. While ALF 180 is illustrated as an in-loop filter example to process deblocked signal 172, other in-loop filter such as edge offset or band offset may also be used as in-loop filter. The in-loop filter can be applied to reconstructed video data 152, deblocked signal 172, or in-loop reconstructed video data mentioned above. Furthermore, when SAO is used as in-loop filter to replace the ALF in FIG. 1, ALF may be used as the processing of reconstructed video to generate in-loop reconstructed video.

In the recent HEVC development, adaptive loop filtering (ALF) has been adopted to process in-loop reconstruction frames. In HEVC, conventional ALF is selectively turned ON or OFF for each block in a frame or a slice. The block size and block shape can be adaptive, and the information of block size and block shape can be explicitly sent to decoders or implicitly derived by decoders. In one approach, the blocks are resulted from quadtree partitioning of LCUs (Largest Coding Units). According to a performance criterion, the video encoder will determine whether a block is subject to ALF or not, and uses an ALF flag to signal the ON/OFF decision for each block so that a decoder can apply ALF accordingly. While ALF has been shown to improve visual quality of in-loop reconstructed video, the ALF processing used in the early ALF development was limited where a single adaptive loop filter can only be turned ON or OFF. ALF typically uses a two-dimensional (2D) linear filter for spatial filtering. Examples of filter dimension used in practice may be 5×5, 7×7 or 9×9. Nevertheless, filters having other sizes may also be used for ALF. The filter coefficients usually are optimally designed to match the characteristics of the underlying image area of the picture. For example, the filter coefficients can be designed to minimize the mean square error (MSE) by using Wiener filter. To reduce implementation cost, the 2D filter may be designed to be separable so that the 2D filter can be implemented using two separate one-dimensional filters where one is applied to the horizontal direction and the other is applied to the vertical direction. Since the filter coefficients may have to be transmitted, symmetric filters may be used to save the side information required. Other types of filters may also be used to reduce the number of coefficients to be transmitted. For example, a diamond-shaped (also called rhombus) filter may be used where constellation of non-zero coefficients has a diamond shape. In U.S. patent application Ser. No. 13/093,068, entitled "Method and Apparatus of Adaptive Loop Filtering", filed Apr. 25, 2011, an advanced ALF is disclosed that applies a choice of multiple filter sets to the in-loop reconstructed video data adaptively. Furthermore, the in-loop reconstructed video data is classified into multiple categories using classification, and an adaptive loop filter is selected from the candidate filter set for each of the categories. The classification can be based on characteristic derived from the in-loop reconstructed video data such as pixel intensity, edge activity, edge orientation, edge intensity, mode information, quantization parameter, residual energy, regional feature, motion information, and a combination of the above.

An ALF scheme (called QC_ALF) was proposed by Qualcomm ("Video coding technology proposal by Qualcomm Inc.", Karczewicz et al., Joint Collaborative Team on Video Coding (JCT-VC) of ITU-T SG16 WP3 and ISO/IEC JTC1/SC29/WG11, 1st Meeting: Dresden, Del., 15-23 Apr. 2010, Document: JCTVC-A121. According to QC_ALF, the ALF is applied to the in-loop reconstructed video data on a pixel by pixel basis. For each block, the Sum-modified Laplacian Measure (SLM). The SLM value computed for each pixel of the block is used to classify the pixel into one of M groups. The SLM-based ALF is applied on a pixel by pixel basis and pixels may use different filters. Therefore, the QC_ALF is also referred to as pixel-adaptive or pixel-adaptation (PA) ALF.

While the PA ALF can adaptively select a filter on a pixel by pixel basis, it requires deriving the group information based on the SLM for each pixel on the decoder side based because the required side information will be substantial if it is coded. Accordingly, a region based ALF scheme is disclosed in U.S. patent application Ser. No. 13/093,068, filed Apr. 25, 2011. The regions can be formed by dividing a picture or a picture area into fixed blocks or fixed sets of blocks. Alternatively, the regions can be formed by partitioning a picture or a picture area recursively. For example, quadtree may be used for recursive region partitioning. A flag in the syntax for ALF information set is used to indicate whether the region based ALF is applied or non-region based ALF method is applied. For example, a flag can be used to select between region-based ALF and block-based ALF. The filter selected for the block can be derived from a similar method used in the pixel-based ALF. For example, Chong et al, described a block based ALF, where Laplacian based activity metrics of 4×4 blocks are averaged so that each 4×4 block can use one Laplacian activity value (Chong et al., "CE8 Subtest 2: Block based adaptive loop filter (ALF)", Joint Collaborative Team on Video Coding (JCT-VC) of ITU-T SG16 WP3 and ISO/IEC JTC1/SC29/WG11, 5th Meeting: Geneva, CH, 16-23 Mar. 2011, Document: JCTVC-E323). The method requires computing the Laplacian activity value for each pixel of the 4×4 block and does not save any computation over the conventional pixel-based ALF. However, the block-based ALF can reduce the frequency of filter switching activity in comparison with the pixel-based ALF. Instead of using Laplacian activity as a classifier, other measurement, such as the band offset (BO) or the edge offset (EO) classifier used for sample adaptive offset (SAO), may also be used to replace the SLM computation used by Karczewicz et al. Both BO and EO require much fewer computations compared with the SLM measurement.

The filter selection may also be based on classification of reconstructed video data. If the underlying reconstructed video data involved are associated only with previously coded data, the classification-based filter selection is useful for ALF selection using the implicit mode since the decoder may derive the same classification without side information. When filter selection based on classification is used, the underlying coded video data is classified into multiple categories based on a feature measured from the underlying reconstructed video data. The measured feature may be associated with pixel intensity level, edge orientation, edge intensity, mode information, quantization parameter, residual energy, region location, motion information, or a combination of the above. For example, the edge orientation is used as classification for filter selection, a 3×3 pixel window may be used to detect edge or line orientations along 0°, 45°, 90°, and 135°.

While multiple classifiers based on different features can be combined to divide pixels into categories for adaptively applying ALF, the multiple features may also be used selectively according to a flag. For example, the classifier based on regional feature can be used with the classifier based on edge intensity selectively. A flag can be used to indication whether the regional feature or the edge intensity feature is used as classifier for the picture. Furthermore, the picture may be divided into several regions and the classification selection is performed for individual regions. Regions in the same category will share the same filter. The regions can be filter units or coding units. Furthermore, the regions may also be formed based on pixel location.

While the method according to U.S. patent application Ser. No. 13/093,068 improves system performance, it is desirable to develop advanced in-loop filter scheme that can further improve system performance. Accordingly, an advanced in-loop filter scheme is developed that divides pixels of image data into to-be-filtered regions and applying rate-distortion optimization to select an in-loop filter from a filter set for each to-be-filtered region. The image can be a frame, a field, or a portion of a picture such as a slice or slices. The to-be-filtered regions can be formed by partitioning an image into blocks and each block may be processed by an in-loop filter, where the filter is selected according to the rate-distortion optimization process. The blocks formed by partitioning the image data are referred to as filter units (FUs). The FUs may be formed using quadtree or simply formed by dividing the image data into equal-sized blocks. The equal-sized blocks may be adaptively merged according to the rate-distortion optimization process. Alternatively, the FU can also be adaptively split according to the rate-distortion optimization process. Furthermore, the FU partition may be CU-aligned, where boundaries of the filter units are boundaries of the coding units, and each of the filter units contains at least one coding unit.

Figure 2A:
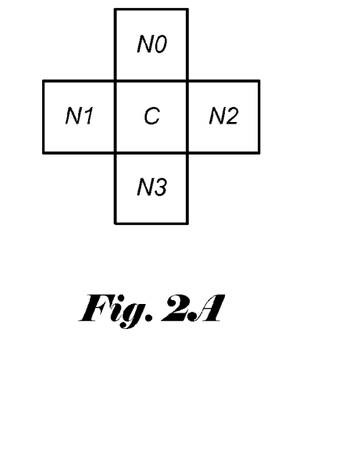
FIG. 2A illustrates a configuration consisting of a current pixel and four neighboring pixels for edge-based classification.
Figure 2B:
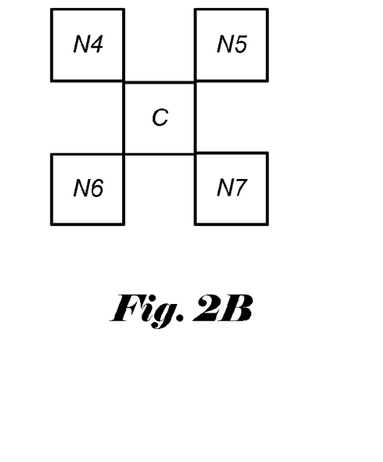
FIG. 2B illustrates an alternative configuration consisting of a current pixel and four neighboring pixels for edge-based classification.
Figure 3:
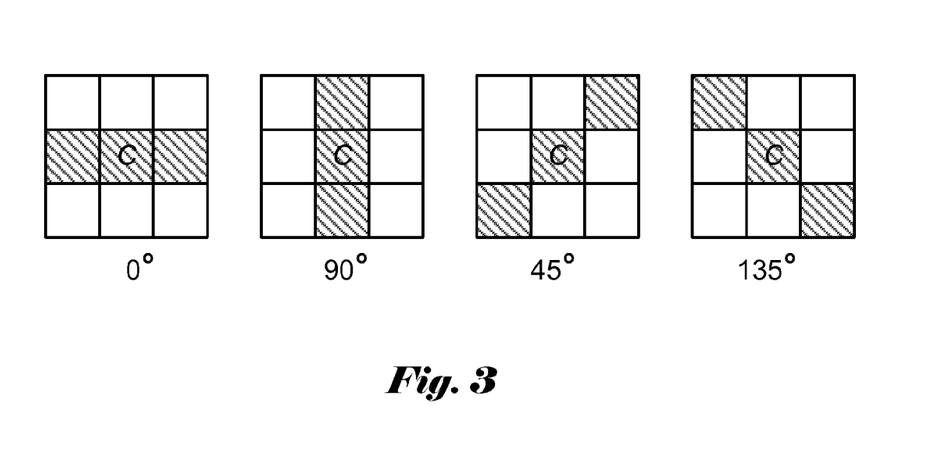
FIG. 3 illustrates exemplary classification based on edge classifier having orientation at 0°, 45°, 90° and 135°.

The to-be-filtered regions may also be formed by dividing the image data according to classification. There are many different methods of classifying the image area into multiple to-be-filtered regions. For example, an edge-based classification method is disclosed by McCann et al., entitled "Samsung's Response to the Call for Proposals on Video Compression Technology", in Document: JCTVC-A124, Joint Collaborative Team on Video Coding (JCT-VC) of ITU-T SG16 WP3 and ISO/IEC JTC1/SC29/WG11, 1st Meeting: Dresden, Del., 15-23 Apr. 2010. McCann et al. uses four neighboring pixels N0, N1, N2 and N3 around current pixel C to classify the current pixel into multiple classes as shown in FIG. 2A. McCann et al. uses edge-based classification for the purpose of offset compensation for intensity level. Therefore, the edge-based classification is also referred to as edge offset classification or edge offset in brief. An alternative neighboring pixel configuration is disclosed in the U.S. patent application Ser. No. 12/987,151, entitled "Apparatus and Method of Adaptive Offset for Video Coding", filed Jan. 9, 2011, as shown in FIG. 2B. Other edge-based classification may also be used, such as the method of using three pixels in a 3×3 pixel window to detect edge or line orientations along 0°, 45°, 90°, and 135° as shown in FIG. 3. While the to-be-filtered region can be formed using classification or partitioning as described above, the to-be-filtered region can be formed using a combination of classification and partitioning according to an embodiment of the present invention. For example, the classification may also be applied to the to-be-filtered regions (i.e., FUs in this case) formed by partitioning an image into blocks. In other words, the image data may be partitioned into FUs first and each FU can be classified into final to-be-filtered regions.

Besides the edge-based classification mentioned above, classification based on other characteristics of the underlying video data may also be used. For example, the classification may be based on the intensity level of the underlying video. For example, McCann et al. discloses a method to classify image data into 16 bands based on the intensity level for the purpose of offset compensation. The method is referred to as band offset classification or band offset in brief. While 16 bands are used, more or less bands may be used. For example, in U.S. patent application Ser. No. 12/987,151, entitled "Apparatus and Method of Adaptive Offset for Video Coding", filed Jan. 9, 2011, a method is disclosed that divides the intensity level into 32 bands organized as two groups. While classifications based on edge offset and band offset are illustrated as examples to classify pixels into to-be-filtered regions, the present invention is not limited to these particular examples and other classification may be used.

The in-loop filter incorporating embodiments according to the present invention can be an in-loop filter type selected from adaptive loop filter (ALF), edge offset (EO) filter or band offset (BO) filter as disclosed in High Efficient Video Coding (HEVC). Furthermore, an embodiment according to the present invention incorporates multiple filters and uses rate-distortion process to determine a filter for each to-be-filtered region. The to-be-filtered regions, that the image area is classified into, can be the filter units mentioned before. In the following illustration, the estimation of the distortion caused by ALF-based Wiener filtering is derived. The notations of signals involved at various stages, as shown in FIG. 1, are as follows:
s(k): original signal,
x(k): in-loop reconstructed signal,
y(k): restored signal, and
$w_i$: Wiener filter coefficients.
The restored signal, y(k) by an adaptive loop filter (ALF) at location k is related to the in-loop reconstructed signal, x(k) according to:

$$y(k) = \sum_{i=0}^{N-1} w_i \cdot x(k-i), \tag{1}$$

where $w_i$ is the coefficient of the ALF and N is the total number of coefficients $w_i$. One-dimensional signal representation has been used for two-dimensional video data to simplify the notation in this disclosure. Nevertheless, it is understood that the underlying video data are two-dimensional signals and the notations can be extended to two-dimensional representation. The total number of pixels in the to-be-filtered region is K. As mentioned above, the to-be-filtered region can be a filter unit (FU) as mentioned before, or a group of pixels from classification where the pixels may not contiguous or organized in a rectangular shape. The mean square error (MSE) $\varepsilon$ for the FU can be computed based on $$\varepsilon = 1/K \sum_{k=0}^{K-1} [(y(k) - s(k))^2]. \tag{2}$$

In a straightforward implementation of MSE computation for the to-be-filtered region, the restored signal y(k) has to be computed using a selected filter according to equation (1). The mean square error between the restored signal and the original signal is computed according to equation (2). When the rate-distortion optimization method is used to guide the filter selection for each to-be-filtered region, the distortion MSE has to be computed for all possible filters. In other words, each of the possible filters is applied to the in-loop reconstructed signal to obtain the restored signal and the respective MSE is computed based on the restored signal and the original signal. Consequently, the rate-distortion optimization process will involve intensive computation and excessive data access. This will consume lots of system resources such as computational power and bandwidth. Therefore, it is desirable to develop a scheme that can reduce the requirements of computational complexity and bandwidth.

The mean square error (MSE) $\epsilon$ for the to-be-filtered region can be estimated as follows:

$$\varepsilon = E[(y(k) - s(k))^2] = E\left[\left(\sum_{i=0}^{N-1} w_i \cdot x(k-i) - s(k)\right)^2\right] \quad (3)$$

$$= \sum_{i=0}^{N-1} w_i \sum_{j=0}^{N-1} w_j \cdot r_{xx}(j, i) - 2 \cdot \sum_{i=0}^{N-1} w_i \cdot r_{xs}(i) + r_{ss}(0)$$

$$= \sum_{i=0}^{N-1} w_i \left(\sum_{j=0}^{N-1} w_j \cdot r_{xx}(j, i) - 2 \cdot r_{xs}(i)\right) + r_{ss}(0),$$

where, $$r_{xx}(j, i) = \frac{1}{K} \sum_{k=0}^{K-1} R_{xx,k}(j, i),$$

$$r_{xs}(i) = \frac{1}{K} \sum_{k=0}^{K-1} R_{xs,k}(i), \text{ and}$$

$$r_{ss}(0) = \frac{1}{K} \sum_{k=0}^{K-1} s(k)^2.$$

Therefore, $$\varepsilon = \frac{1}{K} \sum_{i=0}^{N-1} w_i \left(\sum_{j=0}^{N-1} w_j \sum_{k=0}^{K-1} R_{xx,k}(j, i) - 2 \cdot \sum_{k=0}^{K-1} R_{xs,k}(i)\right) + \frac{1}{K} \sum_{k=0}^{K-1} s(k)^2 \quad (4)$$

Accordingly, the distortion D of the to-be-filtered region having K samples can be estimated by:

$$D = K\varepsilon = \sum_{i=0}^{N-1} w_i \left(\sum_{j=0}^{N-1} w_j \sum_{k=0}^{K-1} R_{xx,k}(j, i) - 2 \cdot \sum_{k=0}^{K-1} R_{xs,k}(i)\right) + \sum_{k=0}^{K-1} s(k)^2, \quad (5)$$

where $\Sigma_{k=0}^{K-1} s(k)^2$ is a fixed term during cost comparison and can be dropped from the cost function. In equation (5), the terms $\Sigma_{k=0}^{K-1} R_{xx,k}(j,i)$ and $\Sigma_{k=3}^{K-1} R_{xx,k}$ represent the auto-correlation of in-loop reconstructed signal x(k) and cross-correlation between in-loop reconstructed signal x(k) and original signal [x(k)]s(k) respectively. The modified distortion D' without the term $\Sigma_{k=0}^{K-1} s(k)^2$ is shown in equation (6):

$$D' = \sum_{i=0}^{N-1} w_i \left(\sum_{j=0}^{N-1} w_j \sum_{k=0}^{K-1} R_{xx,k}(j, i) - 2 \cdot \sum_{k=0}^{K-1} R_{xs,k}(i)\right). \quad (6)$$

Further computational complexity reduction can be achieved by taking into account of the fact, $r_{xx}(j,i)=r_{xx}(0,|i-j|) \triangleq r_{xx}(|i-j|)$. While the distortion in equation (5) or the modified distortion in equation (6) are in a specific form, the distortion or the modified distortion may also be modified or rearranged without departing from the spirit of the present invention. For example, a scaling factor may be included to keep the values within a desired range. The summation for the term $R_{xx,k}(j,i)$ may be performed over index i first and then over index j.

Mean square error ($\epsilon$) between the restored signal and the original signal as shown in equation (2) will require actual filtering using the candidate filter to generate the restored signal. On the other hand, the mean square error (or the distortion D, D=K$\epsilon$) estimated according to equation (5) or the modified distortion estimated according to equation (6) does not need to actually perform the filter. Instead, the distortion or the modified distortion based on equation (5) or equation (6) computes the cross-correlation matrix between the in-loop reconstructed signal and the original signal. The distortion in equation (5) or the modified distortion in equation (6) can be used to derive cost function for selecting the filter during the rate-distortion optimization process. The distortion term of the cost function for selecting filter can be reduced to the distortion in equation (5) or the modified distortion in equation (6). The cost function J based on the modified distortion estimated in equation (6) can be reduced to $$J = \sum_{i=0}^{N-1} w_i \left(\sum_{j=0}^{N-1} w_j \sum_{k=0}^{K-1} R_{xx,k}(j, i) - 2 \cdot \sum_{k=0}^{K-1} R_{xs,k}(i)\right) + \lambda \cdot \sum_{i=0}^{N-1} \text{bitrate}(w_i). \quad (7)$$

Term bitrate ($w_i$) represents the bitrate required to encoded coefficient $w_i$ and other filter related side information. Again, the cost function J based on equation (7) does not need to actually perform the filter. These correlation terms are independent of the filter selected. Therefore, these correlation terms only need to be computed once for each to-be-filtered region in cost function computation during rate-distortion optimization so that the above correlation terms can be shared by all candidate filters. Consequently, an embodiment according to the present invention not only reduces the required computation, but also conservation bandwidth associated with data access. While equation (6) is in a specific form, the cost function may also be modified or rearranged without departing from the spirit of the present invention. Besides, the spirit of deriving cost function in equation (7) based on equation (6) can be applied for deriving other cost function by using equation (5).

Figure 9:
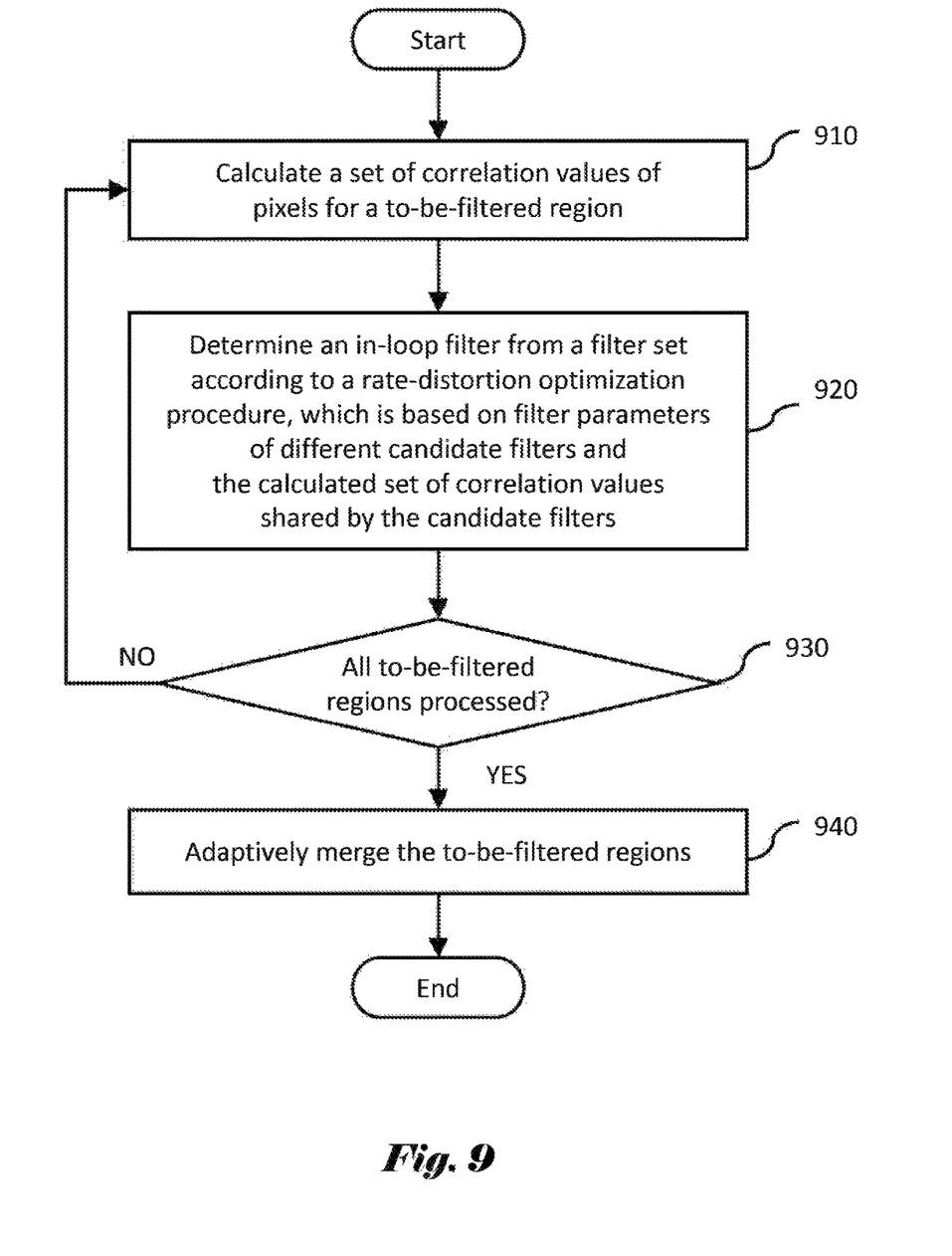
FIG. 9 shows a flow chart outlining a method of determining in-loop filters for to-be-filtered regions according to an embodiment of the disclosure.

FIG. 9 shows a flow chart outlining a method of determining in-loop filters for to-be-filtered regions according to an embodiment of the disclosure. In step 910, a set of correlation values of pixels of a to-be-filtered region is calculated. In step 920, an in-loop filter is determined from a filter set according to if rate-distortion optimization procedure, such as the rate-distortion optimization procedure performed based on equation (7) for example. In some examples, equation (7) is repeatedly applied for all candidate filters based on the filter parameters of different candidate filters in the filter set and the calculated set of correlation values shared by the candidate filters as illustrated above. In step 930, when all to-be-filtered regions are processed, the process proceeds to step 940; otherwise, the process proceeds to step 910 to determine a filter for another to-be-filtered region. In step 940, the to-be-filtered regions are adaptively merged.

The cost function computation according to equation (7) can speed up the rate-distortion optimization process since the correlation terms are shared among all candidate filters. Furthermore, the cost function computation according to equation (7) can substantially reduce bandwidth requirement. According to a conventional cost function computation, the distortion associated with the restored signal and the original signal has to be computed from the restored signal and the original signal for each candidate filter. Consequently, both the restored signal and the original signal for each to-be-filter region have to be accessed for each candidate filter in the filter set. For multiple candidate filters in the filter set, both the restored signal and the original signal will be accessed multiple times. On the other hand, an embodiment according to the present invention only needs to access the in-loop reconstructed signal and the original signal for each to-be-filtered region once for the filter set during rate-distortion optimization process. Consequently, an embodiment according to the present invention substantially reduces the bandwidth requirement. The filter selected according to the rate-distortion optimization process has to be used by the respective to-be-filtered region at the decoder. A flag can be incorporated in the bitstream to indicate the filter selected so that the decoder can operate correctly.

While the computation of cost function according to equation (7) is related to the cross-correlation value of the in-loop reconstructed signal and the original signal and the autocorrelation value of the in-loop reconstructed signal, the computation may also be based on other correlation values. As shown in FIG. 1, deblocked signal 172 is related to reconstructed signal 152 and both deblocked signal 172 and reconstructed signal 152 are considered as in-loop reconstructed signal. Furthermore, reconstructed signal 152 is related to prediction signal 119 and recovered prediction error 162. Therefore, the correlation values used for the computation of cost function may also be based on original signal 112, prediction signal 119 and recovered prediction error 162.

The cost function computation according to equation (7) can also be used to optimize the partitioning of the image data into to-be-filtered regions. For example, when a quadtree is used to partition the image data, the decision regarding whether to split an underlying to-be-filtered region (i.e., FU in this case) into four to-be-filtered regions can be made according to the rate-distortion optimization procedure. The costs associated with the underlying region and the split regions can be efficiently computed for all candidate filters according to equation (7). A region split decision can be made accordingly. Besides the quadtree, other region split methods may also be used. On the other hand, the cost function computation according to equation (7) can also be used to optimize merging of the to-be-filtered regions. Two or more neighboring to-be-filtered regions may be merged to improve the system performance and the region merge decision can be based on rate-distortion optimization. The costs associated with individual regions and the merge region can be efficiently computed according to equation (7) for all candidate filters and a merge decision can be made accordingly. Similarly, the correlation values used for the computation of cost function may also be based on original signal 112, prediction signal 119 and recovered prediction error 162.

One aspect of the present invention is related to candidate filter selection from a filter set comprising various filter sizes and shapes. The rate-distortion optimization procedure is used to select a filter among the filter set to achieve the best system performance. In one example, the candidate filter set for a to-be-filtered region comprises the following filter shapes and sizes:

Square: 3×3, 5×5, 7×7, 9×9, and
Rhombus: 5×5, 7×7, 9×9.

Figure 4A:
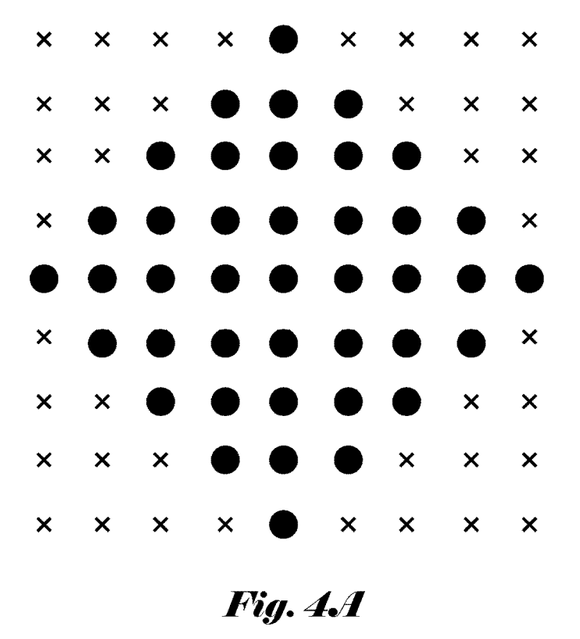
FIG. 4A illustrates an example of 9×9 rhombus filter.
Figure 4B:
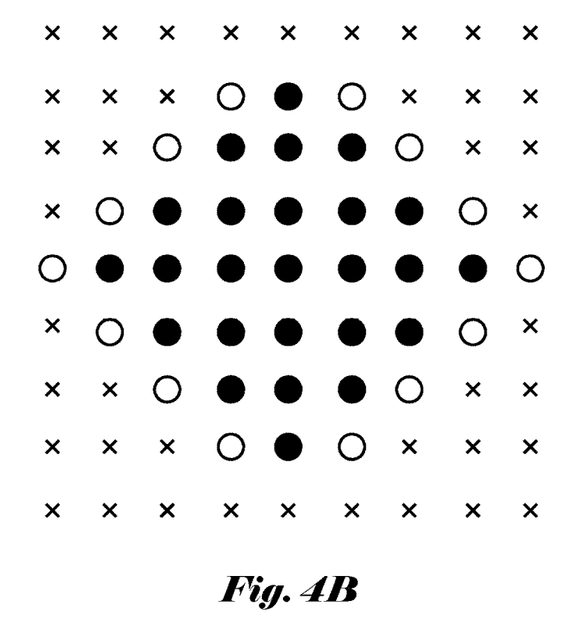
FIG. 4B illustrates an example of 7×7 rhombus filter.
Figure 4C:
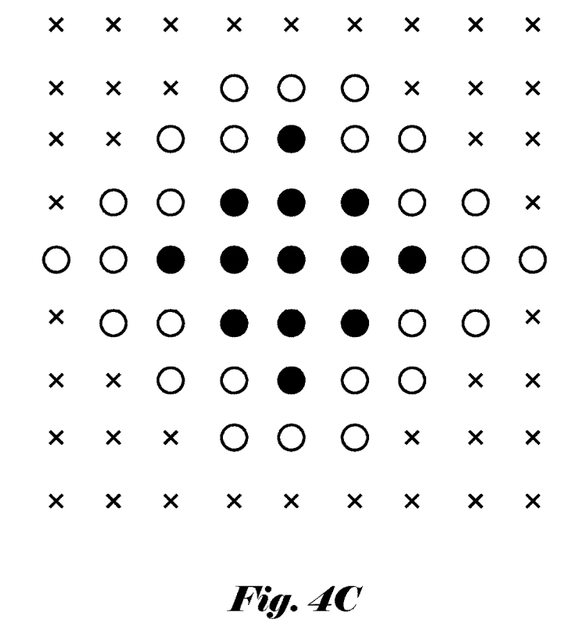
FIG. 4C illustrates an example of 5×5 rhombus filter.
Figure 5:
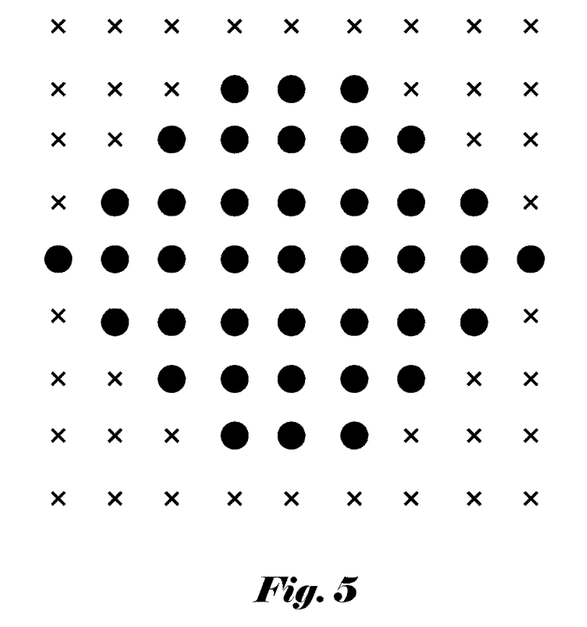
FIG. 5 illustrates an example of 9×7 hexagon filter.

The filters with rhombus shape and sizes 5×5, 7×7, and 9×9 are shown in FIGS. 4A-C. The number of coefficients of the rhombus-shaped filter is roughly half of the respective square filter. The rhombus-shaped filter can be further simplified by eliminating the coefficients on the top and bottom of the vertices. For example, the 9×9 rhombus filter in FIG. 4A can be simplified to a 9×7 hexagon filter as shown in FIG. 5. The 9×7 filter requires less line buffer compared with the 9×9 filter. The selection of filter shape and/or filter size is based on the rate-distortion cost. The cost function computation can be based on the efficient algorithm described in equation (7), and the best filter shape leads to the minimum rate-distortion cost is selected accordingly.

Figure 6:
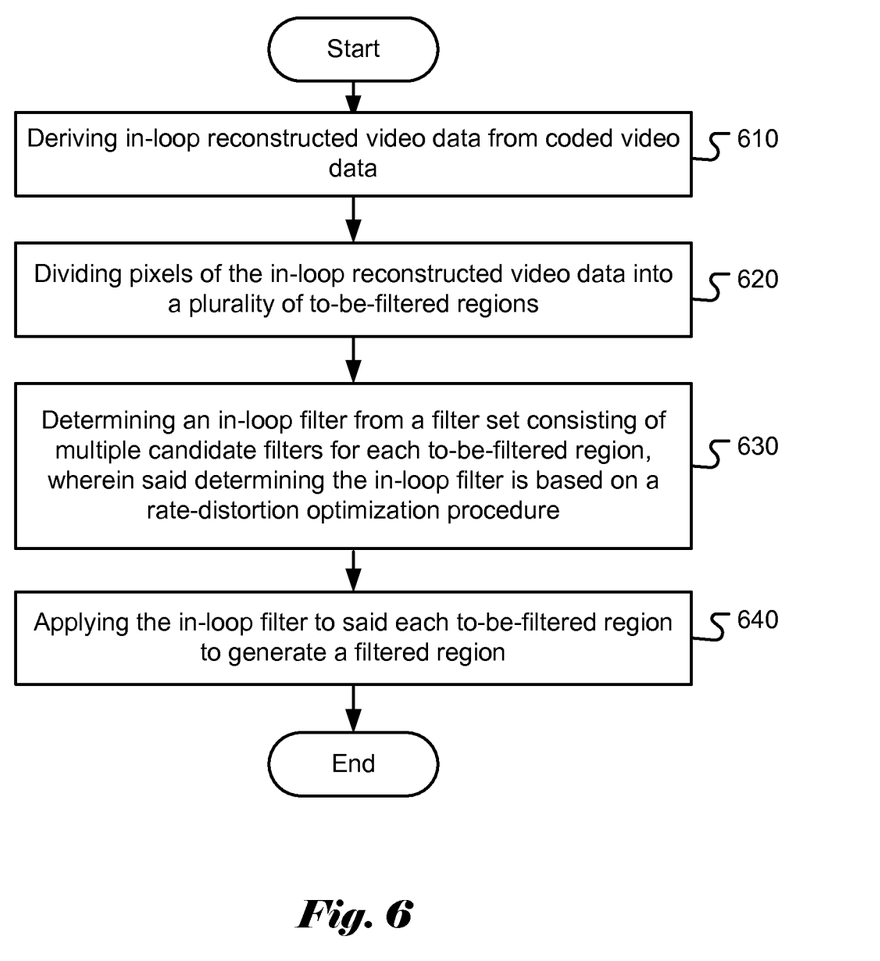
FIG. 6 illustrates an exemplary flow chart for an encoding system incorporating an embodiment according to the present invention.
Figure 7:
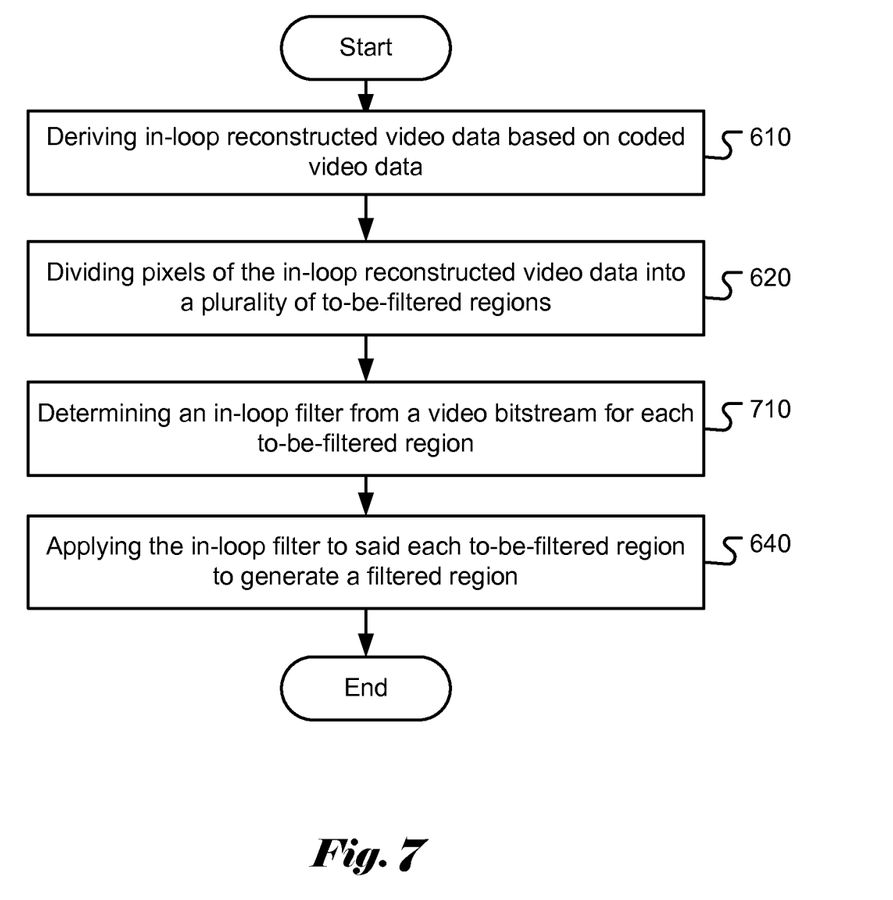
FIG. 7 illustrates an exemplary flow chart for a decoding system incorporating an embodiment according to the present invention.
Figure 8:
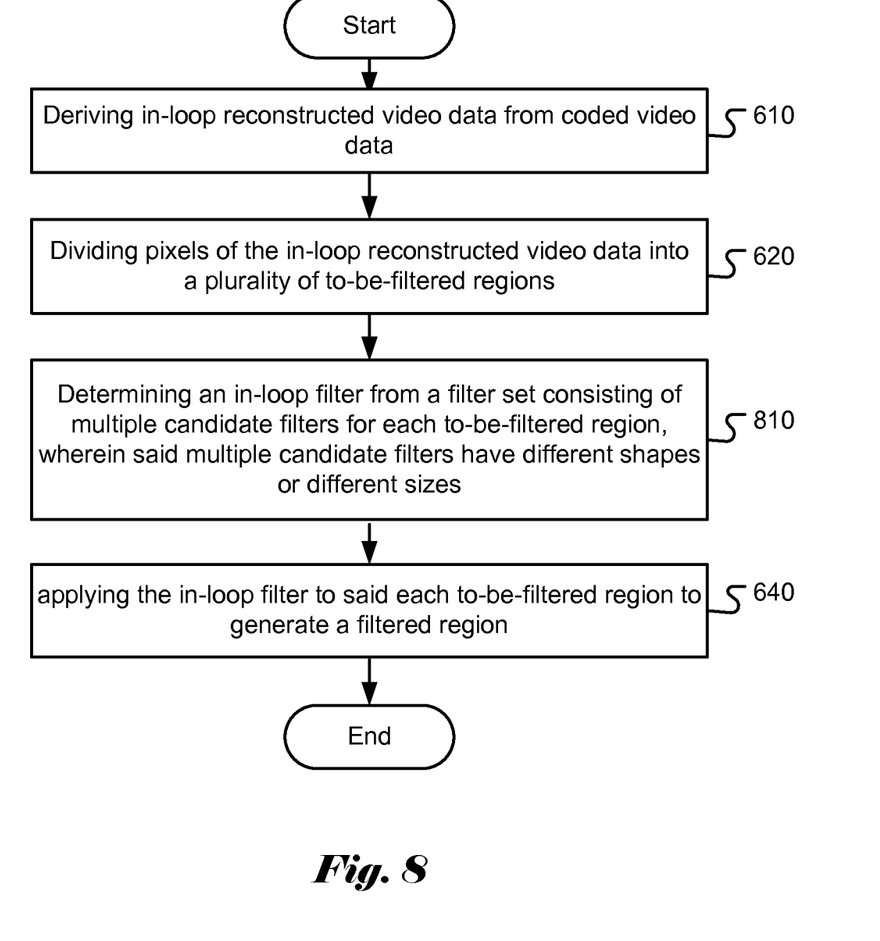
FIG. 8 illustrates another exemplary flow chart for an encoding system incorporating an embodiment according to the present invention.

A flag indicating the filter shape selected can be incorporated in the bitstream to allow a video decoder to apply the selected filter. Exemplary methods incorporating embodiments according to the present invention are illustrated in FIG. 6 through FIG. 8. FIG. 6 illustrates an exemplary flowchart corresponding to an encoding process. The process starts with deriving in-loop reconstructed video data from coded video data in block 610. In the next step, pixels of the in-loop reconstructed video data are divided into a plurality of to-be-filtered regions as shown in block 620. After the plurality of to-be-filtered regions acre form, an in-loop filter from a filter set consisting of multiple candidate filters for each to-be-filtered region is determined based on a rate-distortion optimization procedure as shown in block 630. After the in-loop filter is determined, the in-loop filter is applied to each to-be-filtered region to generate a filtered region as shown in block 640. FIG. 7 illustrates an exemplary flow chart corresponding to a decoding process. The steps in FIG. 7 are substantially the same as these in FIG. 6. However, step 630 is replaced by step 710, where the in-loop filter is determined from a video bitstream for each to-be-filtered region. FIG. 8 illustrates another exemplary flow chart corresponding to an encoding process. The steps in FIG. 8 are substantially the same as these in FIG. 6. However, step 630 is replaced by step 810, where the in-loop filter is determined from a filter set consisting of multiple candidate filters for each to-be-filtered region, wherein said multiple candidate filters have different shapes or different sizes. In some examples, step 630, step 710, or step 810 may be performed in a manner consistent with the examples illustrated with reference to FIG. 9. The exemplary flow charts shown in FIG. 6 through FIG. 8 are intended to illustrate examples to practice the present invention. The specific arrangement of the processing steps should not be construed as limitations to the present invention, A skilled person in the field may rearrange the processing steps and/or splitting/combining some steps to practice the present invention without departing from the spirit of the present invention.

Embodiments of the advanced ALF according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore indicated by the appended claims rather than by the foregoing description. All changes, which come within the meaning and range of equivalency of the claims, are to be embraced within their scope.

The invention claimed is:

1. A method for processing de-blocked reconstructed video, the method comprising:
    deriving de-blocked reconstructed video data from coded video data by applying a de-blocking filter to reconstructed video data comprising video data that was previously encoded;
    dividing pixels of the de-blocked reconstructed video data into a plurality of to-be-filtered regions, wherein the to-be-filtered regions are formed by dividing the de-blocked reconstructed video data into equal-sized blocks until the blocks of all rows of a picture are of equal size or until the blocks of all of the rows of the picture are of equal size except for the blocks of the last row;
    for each of the to-be-filtered regions,
        calculating a set of correlation values of pixels for the respective to-be-filtered region, and
        determining an in-loop filter from a filter set comprising an edge offset filter and a band offset filter for the respective to-be-filtered region, wherein the in-loop filter is determined from the filter set according to a rate-distortion optimization procedure, wherein values of a distortion or cost function associated with the rate-distortion optimization procedure are calculated based on filter parameters of different candidate filters in the filter set and the calculated set of correlation values for the respective to-be-filtered region shared b the candidate filters; and
    applying the determined in-loop filters to the to-be-filtered regions to generate filtered regions.

2. The method of claim 1, wherein the de-blocked reconstructed video data corresponds to de-blocked signal, or ALF (Adaptive Loop Filter) processed signal of the reconstructed video data.

3. The method of claim 1, wherein the correlation values are associated with original video data and the deblocked reconstructed video data.

4. The method of claim 1, wherein the correlation values are associated with original video data, prediction signal and recovered prediction error.

5. The method of claim 1, further comprising a step of incorporating information of the in-loop filter in video bitstream.

6. The method of claim 1, wherein the values of the distortion or cost function associated with the rate-distortion optimization procedure are calculated without applying the candidate filters in the filter set to the de-blocked reconstructed video data.

7. The method of claim 1, wherein the in-loop filter is determined from the filter set according to the rate-distortion optimization procedure, and the rate-distortion optimization procedure is related to a modified distortion, wherein the modified distortion is derived from the distortion by removing a fixed term.

8. The method of claim 7, wherein cost function associated with the rate-distortion optimization procedure is related to the modified distortion.

9. The method of claim 1, wherein dividing pixels of the de-blocked reconstructed video data into the plurality of to-be-filtered regions is based on classification of the pixels of the de-blocked reconstructed video data according to intensity of the pixels.

10. The method of claim 1, wherein a flag is used to indicate whether an edge intensity feature is used as a classifier for dividing the to-be-filtered regions.

11. The method of claim 1, wherein the equal-sized to-be-filtered regions are adaptively merged according to the rate-distortion optimization process, wherein the rate-distortion optimization process computes costs associated with individual regions and the merged regions for all candidate filters in the filter et.

12. An apparatus for processing de-blocked reconstructed video, the apparatus comprising one or more electronic circuits configured to:
    derive de-blocked reconstructed video data based on coded video data by applying a de-blocking filter to reconstructed video data comprising video data that was previously encoded;
    divide pixels of the de-blocked reconstructed video data into a plurality of to-be-filtered regions, wherein the to-be-filtered regions are formed by dividing the de-blocked reconstructed video data into equal-sized blocks until the blocks of all rows of a picture are of equal size or until the blocks of all of the rows of the picture are of equal size except for the blocks of the last row;
    for each of the to-be-filtered regions,
        calculate a set of correlation values of pixels for the respective to-be-filtered region, and
        determine an in-loop filter from a filter set comprising an edge offset filter and a band offset filter for the respective to-be-filtered region, wherein the in-loop filter is determined from the filter set according to a rate-distortion optimization procedure, wherein values of a distortion or cost function associated with the rate-distortion optimization procedure are calculated based on filter parameters of different candidate filters in the filter set and the calculated set of correlation values for the respective to-be-filtered region shared by the candidate filters; and apply the determined in-loop filters to the to-be-filtered regions to generate filtered regions.

13. The apparatus of claim 12, wherein the de-blocked reconstructed video data corresponds to de-blocked signal of the reconstructed video data.

14. The apparatus of claim 12, wherein the correlation values are associated with original video data and the de-blocked reconstructed video data.

15. The apparatus of claim 12, wherein the correlation values are associated with original video data, prediction signal and recovered prediction error.

16. The apparatus of claim 12, said one or more electronic circuits are further configured to incorporate information of the in-loop filter in video bitstream.

17. The apparatus of claim 12, wherein the equal-sized to-be-filtered regions are adaptively merged according to the rate-distortion optimization process, wherein the rate-distortion optimization process computes costs associated with individual regions and the merged regions for all candidate filters in the filter set.

* * * * *